US012696104B2

(12) United States Patent
Young et al.

(10) Patent No.: US 12,696,104 B2
(45) Date of Patent: Jul. 28, 2026

(54) SYSTEMS AND METHODS TO ENABLE PROGRAMMABLE XHAUL TRANSPORT

(71) Applicant: Verizon Patent and Licensing Inc., Basking Ridge, NJ (US)

(72) Inventors: Kristen Sydney Young, Morris Plains, NJ (US); Kalyani Bogineni, Irving, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 518 days.

(21) Appl. No.: 16/937,074

(22) Filed: Jul. 23, 2020

(65) Prior Publication Data

US 2022/0030117 A1 Jan. 27, 2022

(51) Int. Cl.
| | |
|---|---|
| *H04W 24/02* | (2009.01) |
| *H04L 41/0806* | (2022.01) |
| *H04L 41/0894* | (2022.01) |
| *H04M 15/00* | (2024.01) |
| *H04W 8/08* | (2009.01) |
| *H04W 72/53* | (2023.01) |
| *H04L 41/40* | (2022.01) |

(Continued)

(52) U.S. Cl.
CPC ......... *H04W 24/02* (2013.01); *H04L 41/0806* (2013.01); *H04L 41/0894* (2022.05); *H04M 15/66* (2013.01); *H04W 8/08* (2013.01); *H04W 72/53* (2023.01); *H04L 41/40* (2022.05); *H04W 28/0268* (2013.01); *H04W 88/085* (2013.01)

(58) Field of Classification Search
CPC .. H04M 15/66; H04M 15/61; H04M 15/8016;

H04M 15/8228; H04L 41/0806; H04L 41/12; H04L 12/1407; H04L 41/082; H04L 41/0893; H04L 41/5009; H04L 41/5058; H04L 43/065; H04L 43/0817; H04W 8/08; H04W 72/0493; H04W 28/0268; H04W 88/085; H04W 24/02; H04W 76/12; H04W 84/042

See application file for complete search history.

(56) References Cited

U.S. PATENT DOCUMENTS

| | | | |
|---|---|---|---|
| 2019/0253917 A1* | 8/2019 | Dao .................. | H04W 28/0268 |
| 2019/0254090 A1* | 8/2019 | Yang .................... | H04W 76/12 |

(Continued)

OTHER PUBLICATIONS

Onap Architecture Dublin Release. ONAP 2019. 11 pages. Accessed online Jul. 23, 2020. https://docs.onap.org/en/dublin/guides/onap-developer/architecture/onap-architecture.html.

(Continued)

*Primary Examiner* — Derrick W Ferris
*Assistant Examiner* — M Mostazir Rahman

(57) ABSTRACT

A device may include a processor configured to receive wireless communication network policies from an orchestration system. The device may be further configured to receive a notification from a radio access network (RAN) central unit (CU) that a packet data unit (PDU) session has been set up in the RAN, wherein the notification includes information associated with the PDU session; identify a programmable switch associated with the PDU session; select a policy, from the plurality of wireless communication network policies, based on the information associated with the PDU session; and configure the programmable switch to apply the selected policy to the PDU session.

20 Claims, 10 Drawing Sheets

(51) Int. Cl.
　　*H04W 28/02*　　　　(2009.01)
　　*H04W 88/08*　　　　(2009.01)

(56)　　　　　　　　References Cited

U.S. PATENT DOCUMENTS

| | | | | |
|---|---|---|---|---|
| 2019/0254118 A1* | 8/2019 | Dao | | H04L 67/141 |
| 2019/0268973 A1* | 8/2019 | Bull | | H04W 92/02 |
| 2020/0092932 A1* | 3/2020 | Youn | | H04W 76/30 |
| 2020/0145876 A1* | 5/2020 | Dao | | H04M 15/66 |
| 2020/0367072 A1* | 11/2020 | Lin | | H04W 16/02 |
| 2020/0367090 A1* | 11/2020 | Zhang | | H04W 28/0247 |
| 2021/0058826 A1* | 2/2021 | Mao | | H04W 28/0804 |
| 2022/0086698 A1* | 3/2022 | Yao | | H04W 28/24 |
| 2022/0104164 A1* | 3/2022 | Kedalagudde | | H04W 76/16 |
| 2022/0159768 A1* | 5/2022 | Zhu | | H04L 1/1642 |

OTHER PUBLICATIONS

ETSI Technical Specification: 5G; NG-RAN; Architecture description, (3GPP TS 38.401 version 15.5.0 Release 15). 41 pages.

3rd Generation Partnership Project; Technical Specification Group Radio Access Network; NG-RAN; E1 Application Protocol (E1AP)(Release 16). 3GPP TS 38.463 V16.0.0 (Dec. 2019). 190 pages.

3rd Generation Partnership Project; Technical Specification Group Radio Access Network; NG-RAN; F1 Application protocol (F1AP)(Release 16). 3GPP TS 38.473 V16.0.0 (Dec. 2019). 239 pages.

* cited by examiner

200

650

| SWITCH ID 710 | TYPE 720 | ENDPOINTS 730 | TIME PERIOD 742 | SESSION ID 752 | TYPE 754 | POLICY 756 | METRICS 758 |
|---|---|---|---|---|---|---|---|

750

740

700

800

810 — RECEIVE AND RECORD SUBSCRIPTION FROM SWITCH CONTROLLER

820 — RECEIVE REQUEST FROM CORE NETWORK TO SET UP PDU SESSION

830 — SET UP PDU SESSION WITH CU-UP AND DU

840 — SEND NOTIFICATION TO SWITCH CONTROLLER

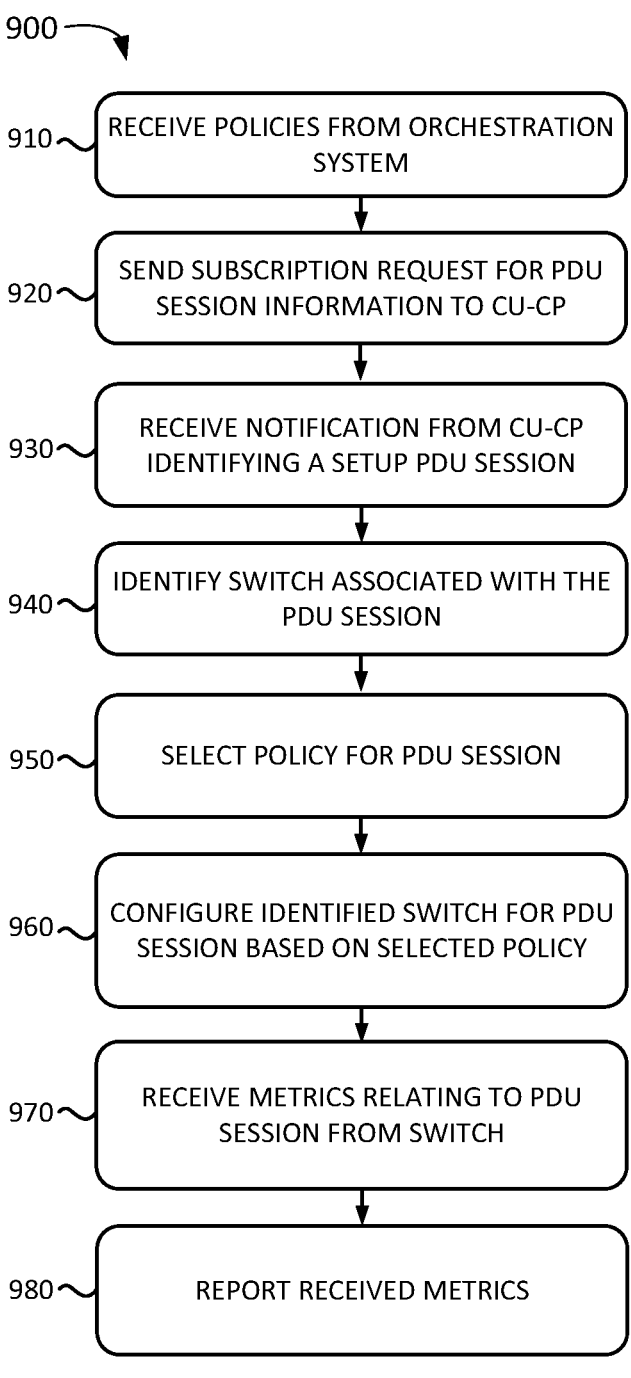

900

910 — RECEIVE POLICIES FROM ORCHESTRATION SYSTEM

920 — SEND SUBSCRIPTION REQUEST FOR PDU SESSION INFORMATION TO CU-CP

930 — RECEIVE NOTIFICATION FROM CU-CP IDENTIFYING A SETUP PDU SESSION

940 — IDENTIFY SWITCH ASSOCIATED WITH THE PDU SESSION

950 — SELECT POLICY FOR PDU SESSION

960 — CONFIGURE IDENTIFIED SWITCH FOR PDU SESSION BASED ON SELECTED POLICY

970 — RECEIVE METRICS RELATING TO PDU SESSION FROM SWITCH

980 — REPORT RECEIVED METRICS

FIG. 9

SYSTEMS AND METHODS TO ENABLE PROGRAMMABLE XHAUL TRANSPORT

BACKGROUND INFORMATION

To satisfy the needs and demands of users of mobile communication devices, providers of wireless communication services continue to improve and expand available services as well as networks used to deliver such services. One aspect of such improvements includes the development of radio access networks as well as options to utilize such radio access networks. A radio access network may include a large number of devices managing a large number of connections. Managing all the different devices in a radio access network poses various challenges.

BRIEF DESCRIPTION OF THE DRAWINGS

FIG. 9 illustrates a flowchart of a process for configuring a switch according to an implementation described herein.

DETAILED DESCRIPTION OF PREFERRED EMBODIMENTS

Figure 1:
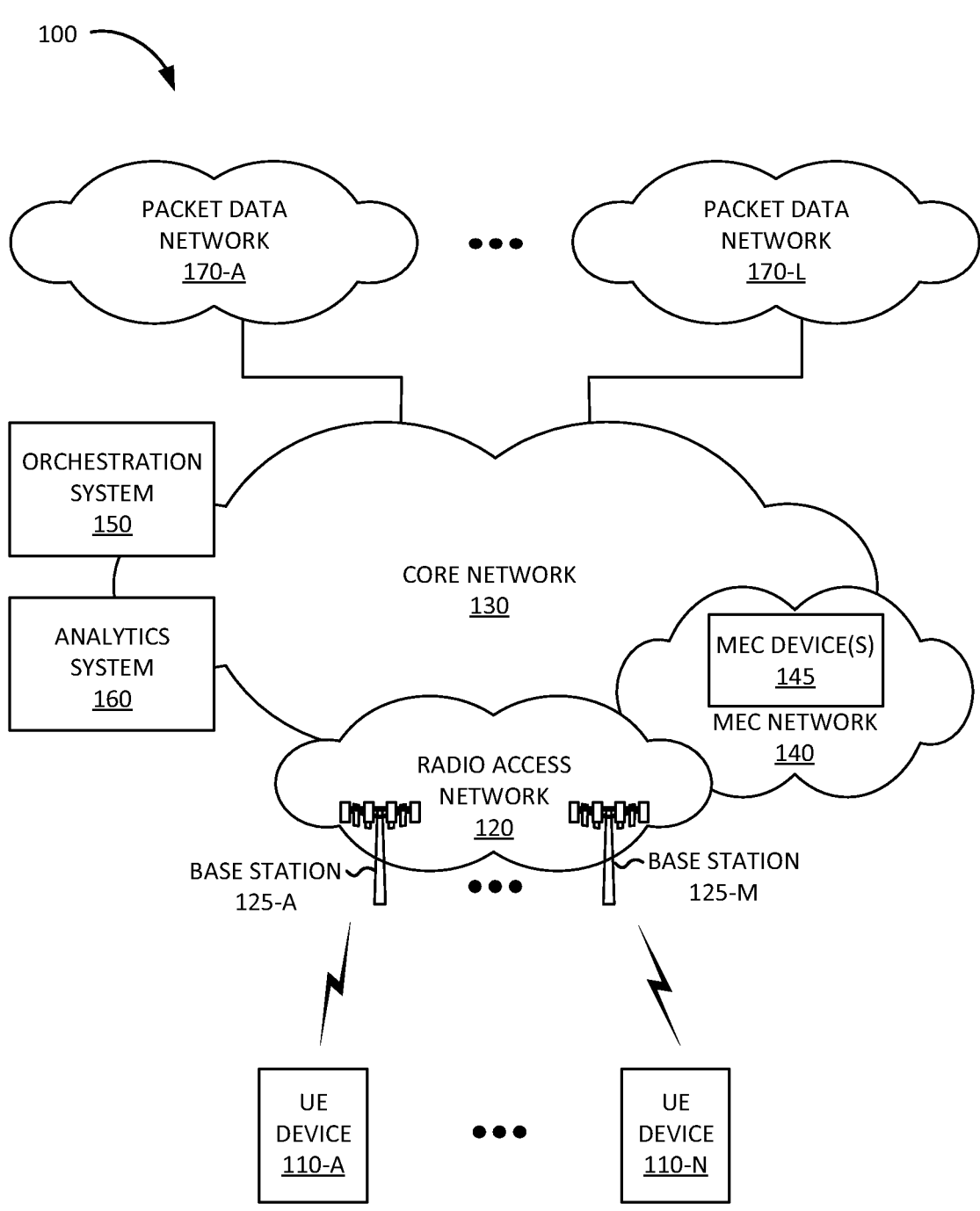
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technology. Additionally, a 5G core network supports and manages 5G radio access networks (RAN) that include base stations, providing various services and enabling connections to other networks (e.g., connections to the Internet, etc.). As an example, a 5G core network may provide support for enhanced Mobile Broadband (eMBB), ultra reliable low latency communication (URLLC), massive Machine Type Communication (mMTC), and/or other types of communications.

One aspect of next generation networks intended to improve functionality and performance is network slicing. Network slicing is a virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Class of Service (CoS) class, and/or particular enterprise customer associated with a set of UE devices.

Another aspect of next generation networks is the implementation of a functional split in a RAN. For example, a RAN may include a central unit (CU) in communication with multiple distributed units (DUs) and each DU may control multiple radio units (RUs). A functional split in a RAN may separate control plane and data plane processing, may enable centralization of higher layer processing functions, and/or may simplify deployment of Carrier Aggregation (CA) and/or Coordinated Multi-Point transmission and reception (CoMP). CoMP include the dynamic coordination of transmission and/or reception at multiple geographically separated sites to improve performance and service quality.

Connections between different components in a RAN with functional splits may be collectively referred to as xHaul. For example, xHaul may include a fronthaul connection between an RU and a DU, a midhaul connection between a DU and a CU, and a backhaul connection from a CU to the core network. Switching and/or routing in xHaul connections may be facilitated by switches.

Different connections and/or sessions in the RAN may be associated with different service level agreement (SLA) requirements. For example, different sessions may be associated with different network slices, different Classes of Service (CoS), different key performance indicator (KPI) requirements, different security requirements, etc. However, a switch may perform switching and/or routing for various sessions without being aware of the different requirements for each session and thus may not be able to process the switching and/or routing tasks with respect to the different requirements.

The ability to use white box programmable transport switches to support xHaul in a RAN may offer more flexibility and lower cost, especially in next generation networks, such as 5G networks, where)(Haul transport may be required to perform complex resource management, forwarding, and/or scheduling. Thus, a programmable switch may be configured to implement different requirements for different sessions, such as, for example, to ensure that sessions for different network slices are assigned a requisite priority. However, a mechanism to automatically provide xHaul transport tunnel context, to enable automated programming of the switches, may not be available.

Implementations described herein relate to systems and methods to enable programmable xHaul transport and to enable automated programming of switches with transport context. The systems and methods described herein support wireless network policies in the transport domain in order to ensure service requirements are met.

A switch controller may be associated with programmable switches, such as, for example, a switch located along a fronthaul connection from an RU to a DU, a switch located along a midhaul connection from a DU to a CU, and/or a switch located along a backhaul connection from a CU to a core network. The switch controller may send a subscription request, to a CU in a RAN, to receive a notification when a new packet data unit (PDU) session is set up in the RAN. The CU may receive and record the subscription request. When the CU receives a PDU session request from the core network, the CU may set up the PDU session across a fronthaul, midhaul, and/or backhaul connection and then send a notification to the switch controller, to indicate that the PDU session has been set up. The notification may include the context of the PDU session, such as information identifying a source, a destination, a protocol, a network slice, a Class of Service (CoS), and/or other types of information.

The switch controller may also receive network policies from an orchestration system. The policies may include, for example, a network slice policy, a CoS policy, a mobility management policy, a security policy, a policy to collect values for a particular KPI, a Self-Optimizing Network (SON) policy, a Multi-Access Edge Computing (MEC) policy, and/or another type of policy. The switch controller may receive the notification from the CU that the PDU session has been set up in the RAN, identify a programmable switch associated with the PDU session, select a policy based on the information associated with the PDU session, and configure the programmable switch to apply the selected policy to the PDU session. For example, the switch controller may identify a network slice associated with the PDU session and select a network slice policy associated with the identified network slice for the PDU session.

The switch controller may also collect metric or KPI values associated with the PDU session from the programmable switch and report the collected data to another device, such as an orchestration system or an analytics system. Furthermore, the switch controller may report a status of the programmable switch to another device. The status may be used for inventory or audit purposes of the RAN. Moreover, the switch controller may receive an update for the selected policy from the orchestration system and reconfigure the programmable switch based on the update. Additionally, the switch controller may receive another notification from the RAN CU indicating that the PDU session has ended and, in response, configure the programable switch to remove the applied policy.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), a radio access network (RAN) 120 that includes base stations 125-A to 125-M (referred to herein collectively as "base stations 125" and individually as "base station 125"), core network 130, MEC network 140 that includes MEC device(s) 145, orchestration system 150, analytics system 160, and packet data networks (PDNs) 170-A to 170-L (referred to herein collectively as "PDNs 170" and individually as "PDN 170").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

RAN 120 may include base stations 125. Base station 125 may include a 5G NR base station (e.g., a gNodeB) and/or a 4G LTE base station (e.g., an eNodeB). Each base station 125 may include devices and/or components for cellular wireless communication with UE devices 110. For example, base station 125 may include a radio frequency (RF) transceiver to communicate with UE devices using a 5G NR air interface using a 5G NR protocol stack, a 4G LTE air interface using a 4G LTE protocol stack, and/or using another type of cellular air interface. Base stations 125 may facilitate handovers in RAN 120. For example, UE device 110 may move from a service area of a first base station 125 to the service area of a second base station 125 and a connection may be handed over from the first base station 125 to the second base station 125 in response.

Core network 130 may be managed by a provider of cellular wireless communication services and may manage communication sessions of subscribers connecting to core network 130 via RAN 120. For example, core network 130 may establish an Internet Protocol (IP) connection between UE devices 110 and PDN 160. In some implementations, core network 130 may include a 5G core network. Exemplary components of a 5G core network are described below with reference to FIG. 2.

In other implementations, core network 130 may include a 4G LTE core network (e.g., an evolved packet core (EPC) network). An EPC network may include devices that implement network functions that include a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 160; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

MEC network 140 may include one or more MEC devices 145. MEC devices 145 may provide MEC services to UE devices 110. As an example, a MEC service may include a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, a virtual network function (VNF), and/or another type of network service. As yet another example, a MEC service may include control of IoT devices, such as hosting an application server for autonomous vehicles, a security system, a manufacturing and/or robotics system, and/or another type of IoT system.

Orchestration system 150 may include one or more computer devices, such as server devices, to orchestrate devices and policies in core network 130. For example, orchestration system 150 may determine whether a particular network function in core network 130 is to be created, deleted, and/or modified; may manage the creation, deletion, and/or modification of network slices in core network 130; may manage the creation, deletion, and/or modification of CoS policies, mobility management policies, security policies, KPI collection policies, Self-Optimizing Network (SON) policies, MEC policies, and/or other types of wireless communication network policies; and/or may perform other types of orchestration tasks in core network 130. Orchestration system 150 may send a set of policies to a switch controller in RAN 120 to implement the set of policies in the transport domain of RAN 120.

Analytics system 160 may include one or more computer devices, such as server devices, to perform analytics based on KPI values obtained from RAN 120 an/or core network 130. For example, analytics system 160 may instruct a switch controller in RAN 120 to collect values for a KPI and the switch controller may report obtained values for the KPI to analytics system 160.

PDNs 160-A to 160-L may each include a packet data network. A particular PDN 160 may be associated with an Access Point Name (APN) and a UE device may request a connection to the particular PDN 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
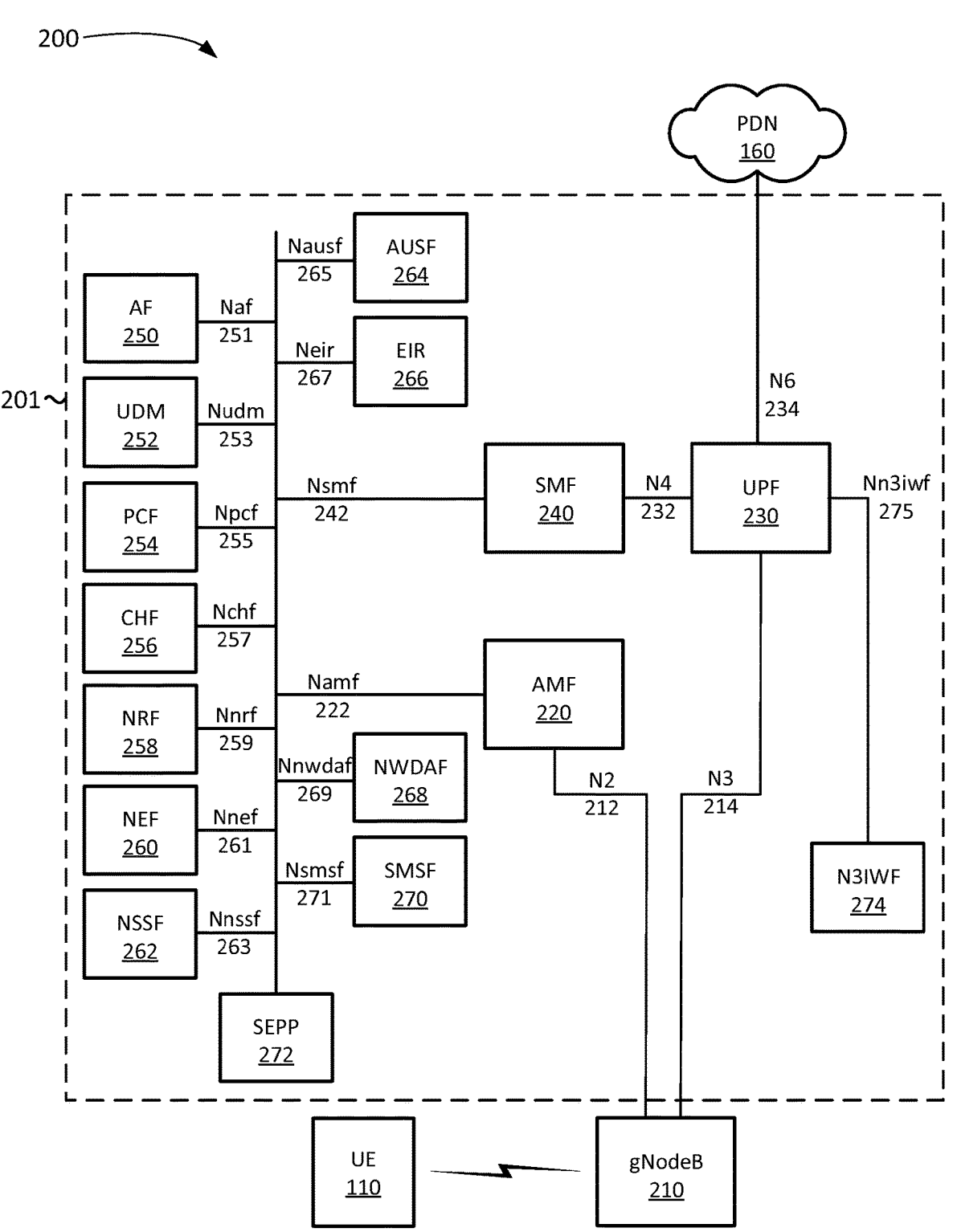
FIG. 2 illustrates exemplary components of the core network of FIG. 1 according to an implementation described herein.

FIG. 2 illustrates exemplary implementation 200 of components of core network 130. As shown in FIG. 2, implementation 200 may include UE 110, gNodeB 210, core network 201, and PDN 160. Core network 201 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 201 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274. gNodeB 210 may be part of RAN 120 and may include base station 125. Exemplary components of gNodeB 210 are describe below with reference to FIG. 3.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140 (e.g., an IMS network, a MPN, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, a third-party application running on server device 280 in a particular data network 140, and/or other types of applications. AF 250 may be accessible via an Naf interface 251, also referred to as an NG5 interface. For example, server device 280 may be configured to communicate with, or to function as, a particular AF 250 (shown as the dotted line connecting AF 250 and server device 280 in FIG. 2).

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may store, in a subscription profile associated with a particular UE device 110, a list of network slices which the particular UE device 110 is allowed to access. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network Key Performance Indicators (KPIs) associated with the NF instance. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 130, translate information between core network 130 and devices/networks external to core network 130, support a Packet Flow Description (PFD) function, and/or perform other types of network exposure functions. NEF 260 may include a slice manager that selects a network slice for a particular UE device 110 based on a request received from a particular AF 250, as described herein. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may provide a list of allowed slices for a particular UE device 110 to UDM 252 to store in a subscription profile associated with the particular UE device 110. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 130 and/or core network 130. For example, NWDAF 268 may collect accessibility KPIs (e.g., an Radio Resource Control (RRC) setup success rate, a Radio Access Bearer (RAB) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 130 and the non-3GPP access device. N3IWF 274 maybe accessible via Nn3iwf interface 275.

Although FIG. 2 shows exemplary components of core network 130, in other implementations, core network 130 may include fewer components, different components, differently arranged components, or additional components than depicted in FIG. 2. Additionally, or alternatively, one or more components of core network 130 may perform functions described as being performed by one or more other components of core network 130. For example, core network 130 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
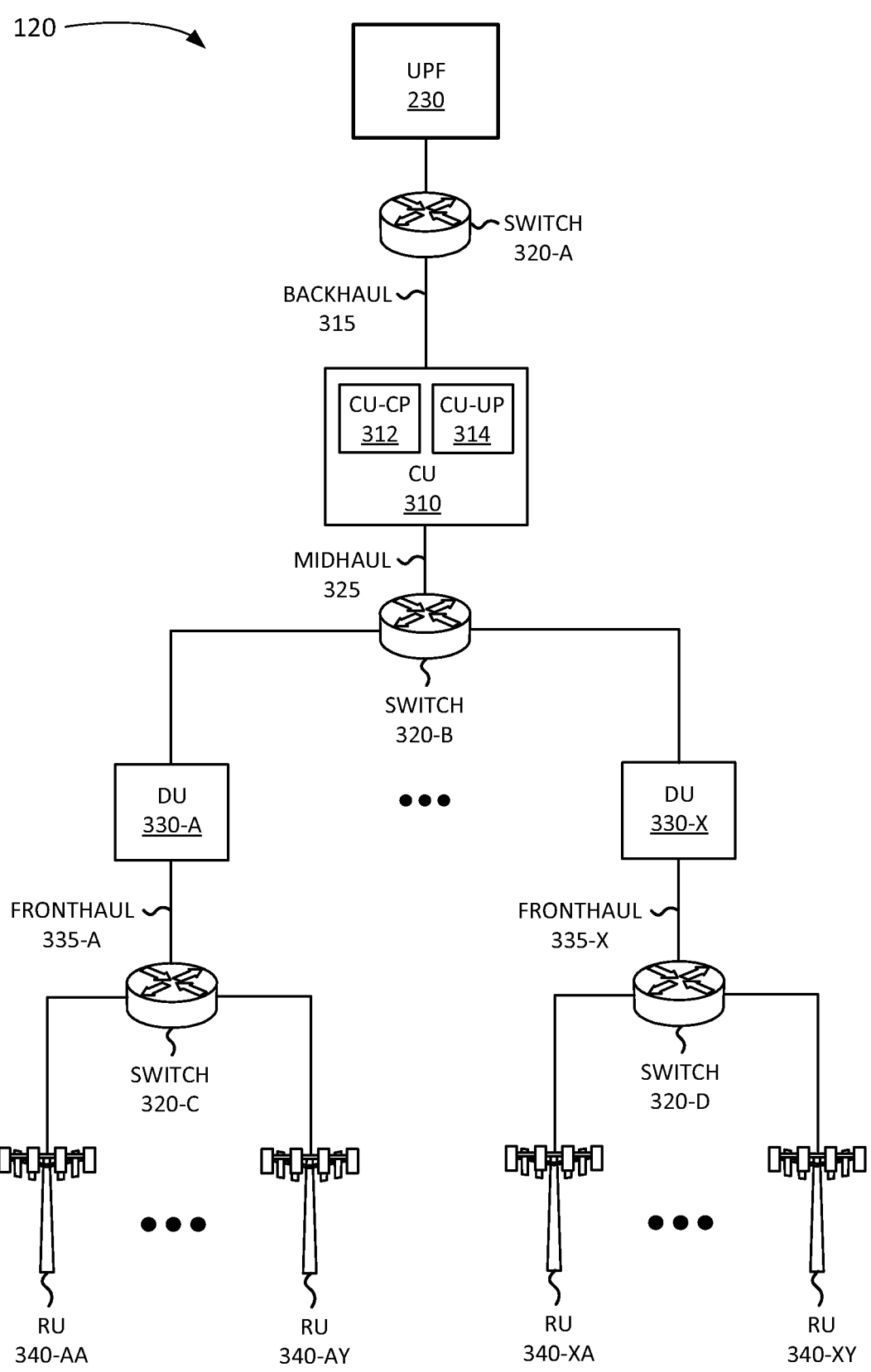
FIG. 3 illustrates exemplary components of the radio access network of FIG. 1 according to an implementation described herein.

FIG. 3 illustrates exemplary components of RAN 120 according to an implementation described herein. As shown in FIG. 3, RAN 120 may include a CU 310, switches 320-A, 320-B, 320-C, and 320-D (referred to herein collectively as "switches 320" and individually as "switch 320"), DU 330-A to 330-X (referred to herein collectively as "DUs 330" and individually as "DU 330"), and RUs 340-AA to 340-XY (referred to herein collectively as "RUs 340" and individually as "RU 340").

CU 310 may include a logical node that includes functionality for control flow processing for gNodeB 210, including, for example, functionality to generate and/or process Radio Resource Control (RRC) protocol messages, Service Data Adaptation Protocol (SDAP) messages, and/or Packet Data Convergence Protocol (PDCP) messages. CU 310 may include CU-CP 312 and CU-UP 314. CU-CP 312 may perform control plane processing for CU 310 and may control one or more DUs 330. CU-UP 314 may perform data plane processing for CU 310, such as forwarding and/or routing messages between DU 330 and core network 130 (e.g., UPF 230). CU-CP 312 may set up PDU sessions in DU 330 and CU-UP 314. CU 310 may terminate an F1 interface with DU 330 and an N3 interface with UPF 230. Furthermore, while FIG. 3 shows UPF 230 connected to CU 310 via backhaul 315, in other implementations UPF 230 may be co-located with CU-UP 314.

Switches 320 may perform switching and/or routing in RAN 120. For example, switch 320-A may perform routing along backhaul 315 from CU 310 to UPF 230, switch 320-B may perform switching and/or routing along midhaul 325 between DUs 330-A to 330-X and CU 310, switch 320-C may perform switching along fronthaul 335-A between RUs 340-AA to 340-AY and DU 330-A, and switch 320-D may perform switching along fronthaul 335-X between RUs 340-XA to 340-XY and DU 330-X. While a single switch 320 is shown for backhaul 315, midhaul 325, fronthaul 335-A, and fronthaul 335-X for illustrative purposes, in practice each of backhaul 315, midhaul 325, fronthaul 335-A, and fronthaul 335-X may include multiple switches 320.

Switch 320 may be programmable. Thus, a switch controller (as described below with respect to FIG. 4) may configure switch 320 to apply a particular set of policies to a PDU session whose PDUs are switched and/or routed by switch 320. For example, PDUs in a buffer of switch 320 may be assigned different priorities based on different network slices associated with the PDUs. In some implementations, switch 320 may be a white box switch. A "white box switch" may correspond to a standard or general switch with either open source software or software that is not obscured from a user of the switch. Thus, a white box switch may be used in a software defined networking (SDN) environment and may be fully programmable by a user (e.g., an administrator of RAN 120) or a device (e.g., a switch controller).

DU 330 may include a logical node that includes lower level functionality for processing (e.g., Layer 2 and/or Layer 1 processing) for gNodeB 210, including, for example, functionality to generate and/or process Radio Link Control (RLC) messages, Medium Access Control (MAC) messages, and/or physical (PHY) layer messages. DU 330 may support multiple Rus 340.

RU 340 may include an RF transceiver with one or more antenna arrays. The antenna array may include an array of controllable antenna elements configured to send and receive 5G NR wireless signals (and/or 4G LTE signals) via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using motors. The antenna array may serve k UE devices 110, and may simultaneously generate up to k antenna beams. A particular antenna beam may service multiple UE devices 110.

Although FIG. 3 shows exemplary components of RAN 120, in other implementations, RAN 120 may include fewer components, different components, differently arranged components, or additional components than depicted in FIG. 3.

Figure 4:
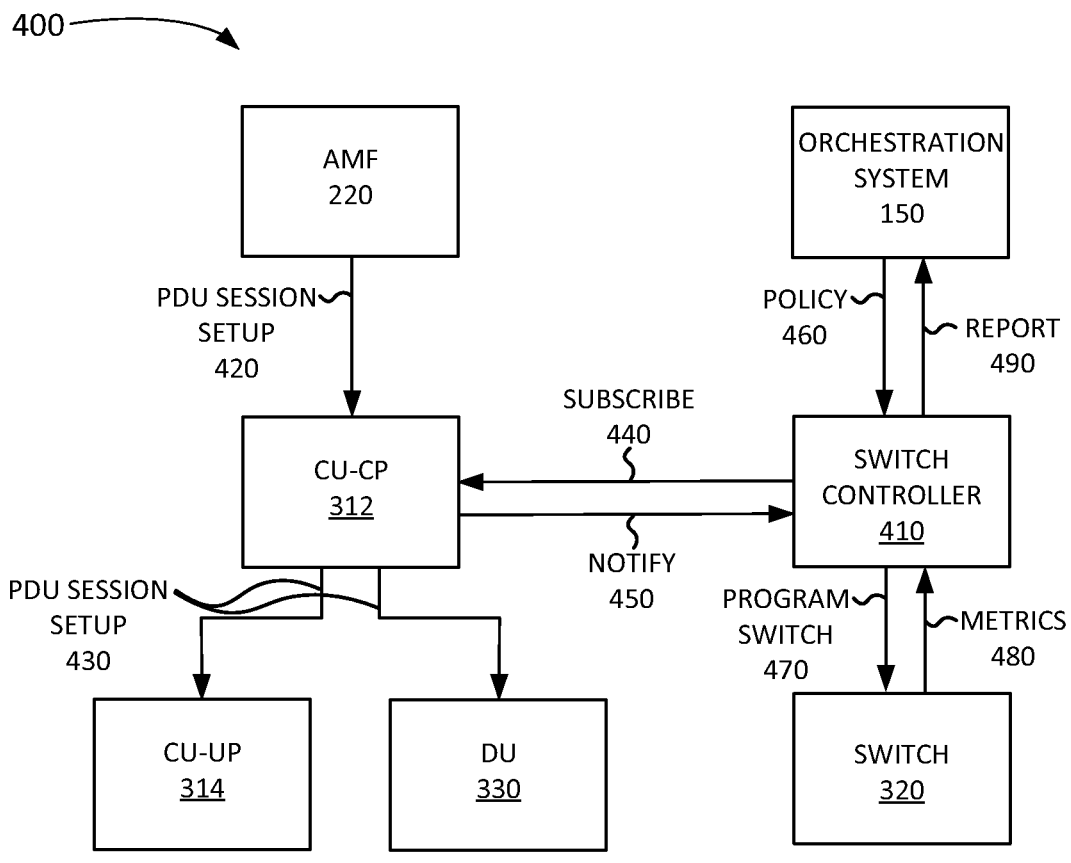
FIG. 4 illustrates exemplary communications between components of the radio access network of FIG. 1 and the core network and orchestration system of FIG. 1 according to an implementation described herein.

FIG. 4 illustrates exemplary communications 400 between components of RAN 120 in relation to core network 130 and orchestration system 150 according to an implementation described herein. More specifically, as shown in FIG. 4, communications 400 are between AMF 220, CU-CP 312, CU-UP 314, DU 330, orchestration system 150, a switch controller 410, and switch 320.

AMF 220 may send a PDU session setup request to CU-CP 312 (signal 420). In response, CU-CP 312 may set up the PDU session, based on the request from AMF 220, with CU-UP 314 and DU 330 (signals 430). After setting up the PDU session, CU-CP 312 may send a notification to switch controller 410 indicating that the PDU session has been set up, based on a subscription request previously received from switch controller 410 (signals 440 and 450). The notification may include information relating to the context of the PDU session, such as network slice identifier, a CoS identifier, an application identifier, and/or other types of identifiers, source and destination addresses for the PDU session, and/or other types of information.

Switch controller 410 may receive a set of policies from orchestration system 150 (signal 460). The policies may include network slice policies, CoS policies, mobility management policies, security policies, KPI collection policies, SON policies, MEC policies, and/or other types of wireless communication network policies. When switch controller 410 receives the notification, switch controller 410 may identify a switch 320 and select a policy based on the PDU context and program the identified switch 320 with the selected policy (signal 470). Furthermore, switch controller may obtain values for metrics/KPIs and report the obtained values to orchestration system 150 and/or analytics system 160 (not shown in FIG. 4) for the PDU session (signals 480 and 490).

Although FIG. 4 shows exemplary components and/or signals in communications 400, in other implementations, communications 400 may include fewer, additional, different, or differently arranged components/signals than those depicted in FIG. 4.

Figure 5:
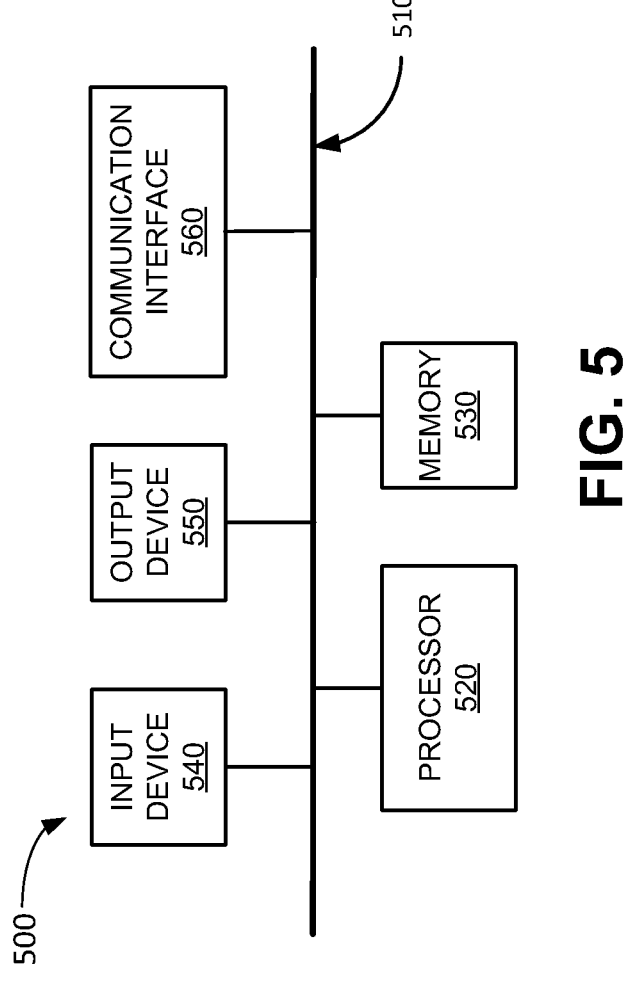
FIG. 5 illustrates exemplary components of device that may be included in the components of FIG. 1, 2, 3, or 4 according to an implementation described herein.

FIG. 5 is a diagram illustrating example components of a device 500 according to an implementation described herein. UE device 110, base station 125, MEC device 145, orchestration system 150, analytics system 160, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, CU 310, switch 320, DU 330, RRH 340, and/or switch controller 410 may each include, or be implemented on, one or more devices 500. As shown in FIG. 5, device 500 may include a bus 510, a processor 520, a memory 530, an input device 540, an output device 550, and a communication interface 560.

Bus 510 may include a path that permits communication among the components of device 500. Processor 520 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into device 500. Input device 540 may include, for example, a keyboard, a mouse, a pen, a microphone, a remote control, an audio capture device, an image and/or video capture device, a touch-screen display, and/or another type of input device. In some implementations, device 500 may be managed remotely and may not include input device 540. In other words, device 500 may be "headless" and may not include a keyboard, for example.

Output device 550 may output information to an operator of device 500. Output device 550 may include a display, a printer, a speaker, and/or another type of output device. For example, device 500 may include a display, which may include a liquid-crystal display (LCD) for displaying content to the user. In some implementations, device 500 may be managed remotely and may not include output device 550. In other words, device 500 may be "headless" and may not include a display, for example.

Communication interface 560 may include a transceiver that enables device 500 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals. Communication interface 560 may be coupled to an antenna for transmitting and receiving RF signals.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communinications and/or a wireless network interface (e.g., a WiFi) card for wireless communications. Communication interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 500 may perform certain operations relating to the operation of a wireless network policy manager in a service mesh and/or a mesh monitoring system. Device 500 may perform these operations in response to processor 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of device 500, in other implementations, device 500 may include fewer components, different components, additional components, or differently arranged components than depicted in FIG. 5. Additionally, or alternatively, one or more components of device 500 may perform one or more tasks described as being performed by one or more other components of device 500.

Figure 6:
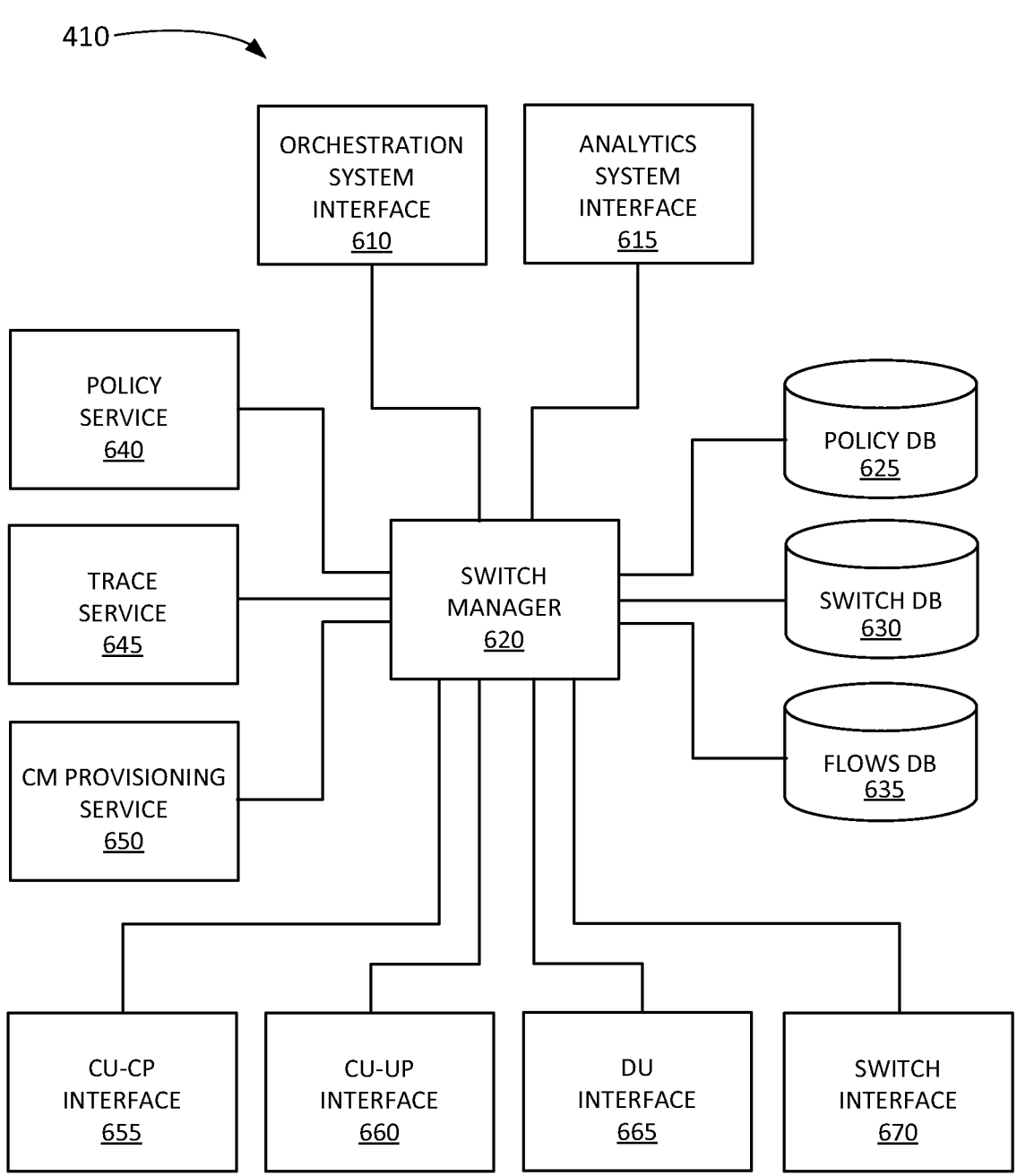
FIG. 6 illustrates exemplary components of the switch controller of FIG. 4 according to an implementation described herein.

FIG. 6 illustrates exemplary components of the switch controller 410 according to an implementation described herein. The components of switch controller 410 may be implemented, for example, via processor 520 executing instructions from memory 530. Alternatively, some or all of the components of switch controller 410 may be implemented via hard-wired circuitry. As shown in FIG. 6, switch controller 410 may include an orchestration system interface 610, an analytics system interface 615, a switch manager 620, a policy database (DB) 625, a switch DB 630, a flows DB 635, a policy service 640, a trace service 645, a configuration management (CM) provisioning service 650, a CU-CP interface 655, a CU-UP interface 660, a DU interface 665, and a switch interface 670.

Orchestration system interface 610 may be configured to communicate with orchestration system 150 and enable orchestration system 150 to configure switch controller 410 using CM provisioning service 650. Analytics system interface 615 may be configured to communicate with analytics system 160 and enable analytics system 160 to collect KPI values and/or metrics using trace service 645. Switch manager 620 may manage switches 320 based on information stored in policy DB 625, switch DB 630, and flows DB 635 using policy service 640, trace service 645, and CM provisioning service 650.

Switch manager 620 may subscribe for notifications relating to PDU sessions set up in RAN 120 from CU-CP 312. Upon receiving a notification, switch manager 620 may identify a particular switch 320 associated with a PDU session based on information stored in switch DB 630, select a policy from policy DB 625 based on the context of the PDU session, and program the identified switch 320 with the selected policy for the PDU session. Furthermore, switch manager 620 may store information relating to the PDU session in flows DB 635.

Switch manager 620 may update the configuration of switch 320 if an updated policy is received from orchestration system 150 and/or may remove an applied policy from switch 320 if a PDU session has ended. Moreover, switch manager 620 may collect values for KPIs/metric for a PDU session and report the collected values to orchestration system 150 and/or analytics system 160. Additionally, switch manager 620 may, at particular intervals, report the status of switches 320 in RAN 120 to orchestration system 150 and/or analytics system 160.

Policy DB 625 may store a set of policies received from orchestration system 150 using policy service 640. As an example, policy DB 625 may store one or more network slice policies associated with a particular Network Slice Selection Assistance Information (NSSAI) value, a Slice/Service Type (SST) value, a Slice Differentiation (SD) value, and/or another type network slice identification value.

As other examples, policy DB 625 may store one or more CoS policies, such as, for example, policies associated with a particular Quality of Service (QoS), QoS Class Identifier (QCI), 5G QCI (5QI), Differentiated Services Code Point (DSCP), IEEE 802.1p CoS (dot1p), etc.; security policies, such as, for example, chain of trust detection policies, malware detection policies, denial of service attack detection policies, encryption policies, policies for flagging anomalous behavior, policies for detecting particular thresholds being exceeded, etc.; policies associated with a particular protocol, such as, for example, General Packet Radio Service (GPRS) Tunneling Protocol (GTP), Packet Data Convergence Protocol (PDCP), Non-Access Stratum (NAS) protocol, 5G-NAS protocol, Diameter protocol, Stream Control Transmission Protocol (SCTP), Hypertext Transfer Protocol (HTTP) 2.0, Transport Layer Security (TLS) protocol, etc.; MEC policies, such as, for example, a policy to route packets associated with a particular application ID to MEC network 140; mobility policies, such as, for example, handover policies; SON policies, such as, for example, load balancing policies, self-healing or error recovery policies, etc.; and/or other types of wireless communication network policies.

Switch DB 630 may store information relating to particular switches 320 in RAN 120. Exemplary information that may be stored in switch DB 630 is described below with reference to FIG. 7. Flows DB 635 may store information relating to particular data flows (e.g., PDU sessions) associated with RAN 120. For each data flow or PDU session, flows DB 635 may store, for example, a PDU session ID, a slice ID (e.g., S-NSSAI, etc.), a source IP address, a destination IP address, a class of service ID (e.g., QoS, QCI, 5QI, DSCP, dot1p, etc.), and/or devices in RAN 120 associated with the PDU flow (e.g., switches 320, DUs 330, RU 340, etc.). When switch manager 620 receives information relating to a PDU session set up by CU-CP 312, switch manager 620 may store the received information in flows DB 635.

Switch controller 410 may provide enrichment services that include policy service 640, trace service 645, and CM provisioning service 650. Policy service 640 may expose a policy service to orchestration system 150 via orchestration system interface 610 and enable orchestration system 150 to specify policies switch controller 410 is to apply to data flows through switches 320, DU 330, and/or CU-UP 314. The policies may be stored in policy DB 625.

Trace service 645 may expose a trace service to analytics system 160 and enable analytics system 160 to subscribe to particular traces. As an example, trace service 645 may provide a performance management (PM) trace to trace the performance of switch 320, DU 330, and/or CU-UP 314 using a selected set of KPIs/metrics. As another example, trace service 645 may provide a fault management (FM) to trace a set of faults and/or errors in switch 320, DU 330, and/or CU-UP 314. As yet another example, trace service 645 may provide a CM trace to trace any changes in a configuration of switch 320, DU 330, and/or CU-UP 314. Trace service 645 may provide any collected trace information to analytics system 160.

CM provisioning service 650 may enable orchestration system 150 to create, update, and/or delete a configuration associated with switch controller 410, such as define a set of switches 320, DUs 330, and/or CU-UPs 314 associated with switch controller 410, a set of slices or services associated with switch controller 410, and/or other types of configuration settings.

CU-CP interface 655 may be configured to communicate with CU-CP 312 and may receive information relating to PDU sessions set up by CU-CP 312. CU-UP interface 660 may be configured to communicate with CU-UP 314 and may provide KPIs/metrics information relating to particular PDU sessions associated with CU-UP 314 to switch manager 620. DU interface 665 may be configured to communicate with DU 330 and may provide KPIs/metrics information relating to particular PDU sessions associated with DU 330 to switch manager 620. Switch interface 670 may be configured to communicate with switch 320. For example, switch interface 670 may use one or more Application Programming Interfaces (APIs) exposed by switch 320 to program switch 320 based on instructions generated by switch manager 620 and/or to collect KPIs/metrics relating to particular PDU sessions associated with switch 320 to switch manager 620.

Although FIG. 6 shows exemplary components of switch controller 410, in other implementations, switch controller 410 may include fewer components, different components, additional components, or differently arranged components than depicted in FIG. 6. Additionally, or alternatively, one or more components of switch controller 410 may perform one or more tasks described as being performed by one or more other components of switch controller 410.

Figure 7:
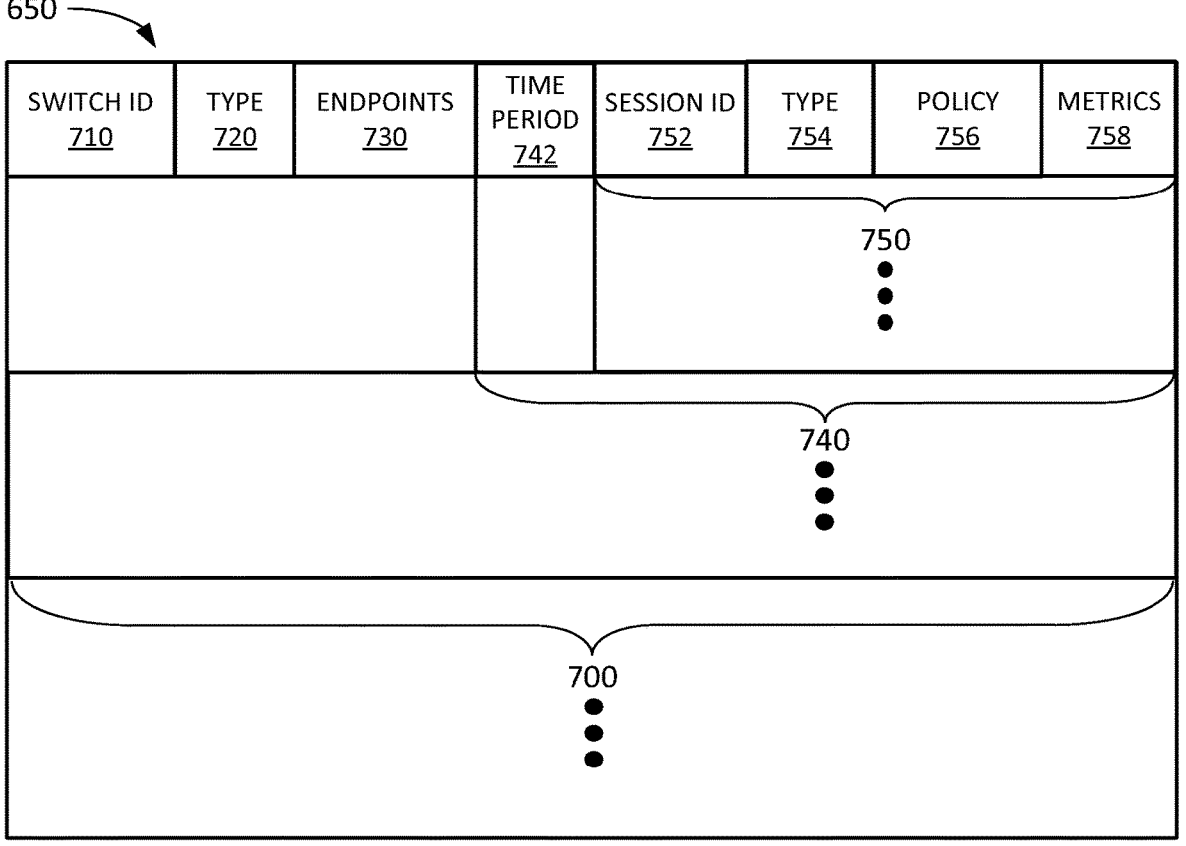
FIG. 7 illustrates exemplary components of the switch database of FIG. 6 according to an implementation described herein.

FIG. 7 illustrates exemplary components of the switch DB 630 according to an implementation described herein. As shown in FIG. 7, switch DB 630 may include one or more switch records 700. Each switch record 700 may store information associated with a particular switch 320. Switch record 700 may include a switch identifier (ID) field 710, a type field 720, an endpoints field 730, and one or more time period fields 740.

Switch ID field 710 may include a unique ID associated with a particular switch 320. Additionally, switch ID field 710 may include an address of the particular switch 320 (e.g., an IP address, a MAC address, etc.) that may be used by switch controller 410 to communicate with the particular switch 320. Type field 720 may include information identifying a type associated with the particular switch 320, such as, for example, whether the particular switch 320 corresponds to a Layer 2 switch, a Layer 3 router, whether the particular switch 320 is located along backhaul 315, midhaul 325, or fronthaul 335, and/or other information identifying a type associated with the particular switch 320. Endpoints field 730 may store information identifying endpoints served by the particular switch 320. For example, endpoints field 730 may identify one or more Rus 340, one or more DUs 330, on or more CUs 310, one or more UPFs 230, one or more MEC devices 145, and/or other types of endpoints.

Each time period field 740 may store information relating to a particular time period. For example, switch DB 630 may store information relating a current time period as well as for previous time periods. Each time period field 740 may include a time period ID field 742 and one or more session fields 750. Time period ID field 742 may store information identifying the particular time period (e.g., one or more timestamps, etc.). Each session field 750 may identify a PDU session being switched or routed in the particular switch 320 during the particular time period.

Session field 750 may include a session ID field 752, a type field 754, a policy field 756, and a metrics field 758. Session ID field 752 may store information identifying a particular PDU session in the particular switch 320, such as, for example, a session ID corresponding to a Layer 5 session in the Open Systems Interconnection (OSI) model. A type field 754 may include information identifying a type associated with the particular session, such as, for example, a network slice ID (e.g., an NSSAI value, an SST value, an SD value, etc.), a CoS value (e.g., a QoS value, a QCI value, a 5QI value, a DSCP value, etc.), a protocol associated with the particular session, an application associate with the particular session, and/or other information relating to a type of PDU session.

Policy field 756 may store information identifying one or more policies that have been selected for the particular PDU session. For example, policy field 756 may identify policies from policy DB 625. Metrics field 758 may store metrics/ KPI values that have been collected from the particular switch 320 for the particular PDU session. For example, metrics field 758 may store values for a transport network KPI, such as, for example, packet loss, packet delay, packet arrival time, load capacity, request count, request duration, request size, response size, number of Transmission Control Protocol (TCP) bytes sent and/or received, the number of TCP connections opened and/or closed, and/or other types of transport network KPIs.

Although FIG. 7 shows exemplary components of switch DB 630, in other implementations, switch DB 630 may include fewer components, different components, additional components, or differently arranged components than depicted in FIG. 7.

Figure 8:
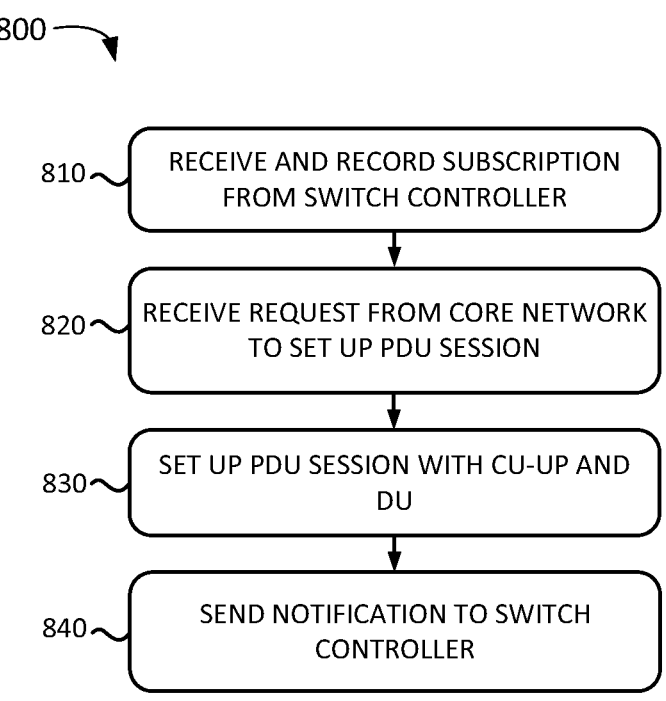
FIG. 8 illustrates a flowchart of a process for setting up a packet data unit session according to an implementation described herein.

FIG. 8 illustrates a flowchart of a process for setting up a packet data unit session according to an implementation described herein. In some implementations, process 800 of FIG. 8 may be performed by CU 310. In other implementations, some or all of process 800 may be performed by another device or a group of devices separate from CU 310.

As shown in FIG. 8, process 800 may include receiving and recording a subscription from a switch controller (block 810). For example, CU-CP 312 may receive a subscription request from switch controller 410 to receive a notification whenever CU-CP 312 sets up a PDU session in RAN 120. A request from core network 130 may be received to set up a PDU session (block 820) and the PDU session may be set up with CU-UP 314 and DU 330 (block 830). For example, UE device 110 may request a connection to UPF 230 and, in response, AMF 220 may instruct CU 310 to set up a PDU session between RU 340 and UPF 230. In response, CU-CP 312 may set up the PDU session. by instructing DU 330 to set up a PDU session between RU 340 and DU 330 and between DU 330 and CU-UP 314, and instruct CU-UP 314 to set up a PDU session between CU-UP 314 and UPF 230.

A notification may then be sent to switch controller 410 (block 840). For example, CU-CP 312 may send a notification to switch controller 410 that a PDU session has been set up, so that switch controller 410 can program switches 320 along the path of the PDU session based on the PDU context. The notification may include information relating to the PDU context, such as, for example, a network slice ID (e.g., an NSSAI value, an SST value, an SD value, etc.), a CoS value (e.g., a QoS value, a QCI value, a 5QI value, a DSCP value, etc.), a protocol associated with the particular session, an application associate with the particular session, a source field for the PDU session (e.g., information identifying a particular RU 340 for an initiating connection, information identifying a particular UPF 230 or MEC device 145 for a terminating connection, etc.), a destination for the PDU session (e.g., information identifying a particular UPF 230 or MEC device 145 for an initiating connection, information identifying a particular RU 340 for a terminating connection, etc.), a tunnel ID or another type of session ID, and/or other types of PDU context information.

FIG. 9 illustrates a flowchart of a process for configuring a switch according to an implementation described herein. In some implementations, process 900 of FIG. 9 may be performed by switch controller 410. In other implementations, some or all of process 900 may be performed by another device or a group of devices separate from switch controller 410.

As shown in FIG. 9, process 900 may include receiving policies from orchestration system 150 (block 910) and sending a subscription request for PDU session information to CU-CP 312 (block 920). For example, orchestration system 150 may provide a set of policies to switch controller 410 and switch controller 410 may store the received policies in policy DB 625. Furthermore, switch controller 410 may send a subscription request to CU-CP 312 to receive a notification when CU-CP 312 sets up a new PDU session in RAN 120.

A notification may be received from CU-CP 312 identifying a setup PDU session (block 930), a switch 320 associated with the PDU session may be identified (block 940), a policy for the PDU session may be selected (block 950), and the identified switch 320 may be configured based on the selected policy (block 960).

For example, switch controller 410 may receive a PDU notification that includes PDU context information as described above with respect to FIG. 8. Switch controller 410 may identify one or more relevant switches 320 associated with the PDU session based on the source and destination information included in the PDU context information and based on information stored in endpoints fields 730 of switch records 700 in switch DB 630. Switch controller 410 may then select one or more policies based on the network slice ID, CoS ID, protocol ID, application ID, and/or another type of ID included in the PDU context information and based on information stored in policy DB 625. Switch controller 410 may then configure each identified switch 320 with the selected policies. As an example, switch controller 410 may instruct each identified switch 320 to apply a particular priority to packets associated with the PDU session based on the selected policies. As another example, switch controller 410 may instruct each identified switch 320 to collect values for metrics/KPIs associated with a selected policy for packets or frames associated with the PDU session.

Furthermore, switch controller 410 may receive an update for a particular policy from orchestration system 150, check switch DB 630 to identify switches 320 that include an active PDU session that includes the particular policy as an applied policy, and update the particular policy in the identified switches 320. Moreover, switch controller 410 may receive another notification from CU-CP 312 that the PDU session has ended and may, in response, configure each of the identified switches 320 to remove the applied policies, in response to receiving the other notification.

Metrics relating to the PDU session may be received (block 970) and the received metrics may be reported (block 980). For example, switch controller 410 may, while the PDU session is active, or after the PDU session has ended, request values for one or more metrics or KPIs for the PDU session. Alternatively, switch 320 may be configured to automatically report the values for one or more metrics or KPIs for the PDU session to switch controller 410. Switch controller 410 may store the received values in switch DB 630 and may later report the stored values to orchestration system 150 and/or analytic system 160. Furthermore, switch controller 410 may, at particular intervals, query switches 320 for status information, such as whether switch 320 is active, operating correctly, and/or reporting any error messages, and may provide the collected status information to analytics system 160. Moreover, switch controller 410 may collect aggregated values for one or more metrics or KPIs at particular intervals and report the aggregated values to analytics system 160.

Figure 10:
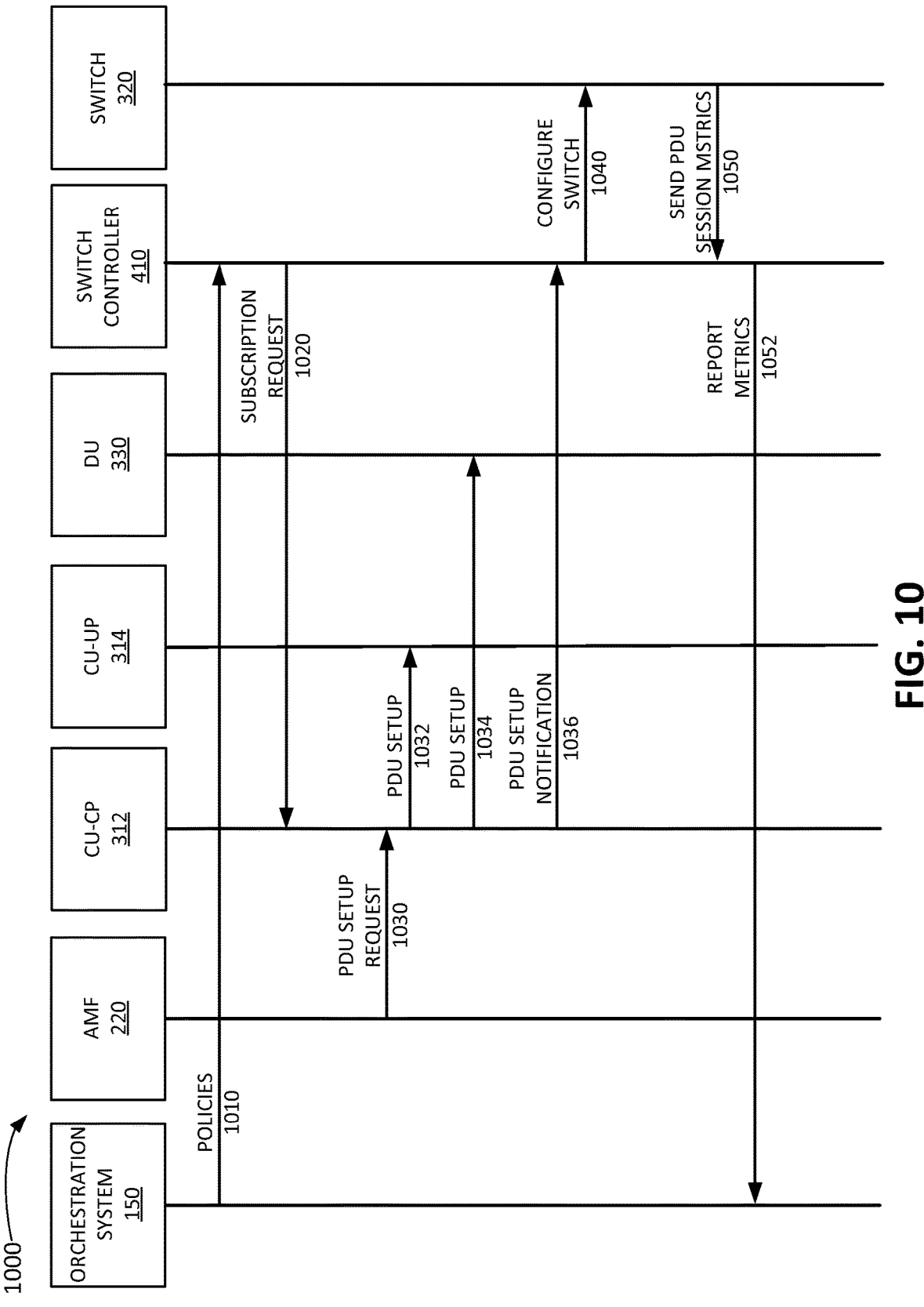
FIG. 10 illustrates an exemplary signal flow according to an implementation described herein.

FIG. 10 illustrates a first exemplary signal flow 1000 according to an implementation described herein. As shown in FIG. 10, signal flow 1000 may include obtaining a set of policies from orchestration system 150 (signal 1010). Signal flow 1000 may further include sending a subscription request to CU-CP 312 to receive a notification when a new PDU session is set up in RAN 120 (signal 1020).

AMF may send a PDU setup request to CU-CP 312 (signal 1030) and CU-CP 312 may, in response, setup a PDU session in CU-UP 314 (signal 1032) and DU 330 (signal 1034). After setting up the PDU session, CU-CP 312 may send a PDU setup notification to switch controller 410 (signal 1036). In response, switch controller 410 may identify one or more switches 320 associated with the setup PDU session, select policies based on PDU context information included in the received notification, and configure the identified switches 320 with the selected policies (signal 1040). Switch 320 may send PDU session metrics values to switch controller 410 relating to the PDU session (signal 1050) and switch controller 410 may report the receive metrics values to orchestration system 150 and/or analytics system 160 (not shown in FIG. 10) (signal 1052).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8 and 9, and a series of signals have been described with respect to FIG. 10, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a device, a plurality of wireless communication network policies from an orchestration system;
   sending, by the device, a subscription request to a radio access network (RAN) central unit (CU) to receive notifications relating to Protocol Data Unit (PDU) sessions set up by the RAN CU, wherein the RAN CU is located in the RAN;
   receiving, by the device, a notification from the RAN CU that a PDU session has been set up in the RAN, wherein the notification includes information associated with the PDU session, based on the sent subscription request;

identifying, by the device, a programmable transport network switch located in the RAN, wherein the programmable transport network switch is associated with the PDU session, and wherein the programmable transport network switch is located along an xHaul connection in the RAN;

selecting, by the device, a policy, from the plurality of wireless communication network policies, based on the information associated with the PDU session; and configuring, by the device, the programmable transport network switch to apply the selected policy to the PDU session along the xHaul connection in the RAN.

2. The method of claim 1, wherein selecting the policy, from the plurality of wireless communication network policies, based on the information associated with the PDU session includes:

determining a network slice associated with the PDU session; and selecting a network slice policy associated with the determined network slice for the PDU session.

3. The method of claim of 1, wherein the selected policy includes at least one of:

a Class of Service (CoS) policy, a mobility management policy, a security policy, a policy to collect values for a particular key performance indicator (KPI), a Self-Optimizing Network (SON) policy, or or a Multi-Access Edge Computing (MEC) policy.

4. The method of claim 1, further comprising:

collecting at least one metric value associated with the PDU session from the programmable switch; and reporting the collected at least one metric value to another device.

5. The method of claim 1, further comprising:

reporting a status of the programmable transport network switch to another device.

6. The method of claim 1, further comprising:

receiving an update for the selected policy from the orchestration system; and reconfiguring the programmable transport network switch based on the update.

7. The method of claim 1, further comprising:

receiving another notification from the RAN CU indicating that the PDU session has ended; and configuring the programmable transport network switch to remove the applied policy, in response to receiving the other notification.

8. The method of claim 1, wherein the programmable transport network switch is located along the xHaul connection from a radio unit (RU) to a distributed unit (DU).

9. The method of claim 1, wherein the programmable transport network switch is located along the xHaul connection from a distributed unit (DU) to the CU.

10. The method of claim 1, wherein the programmable transport network switch is located along the xHaul connection from the CU to a core network.

11. A device comprising:

a processor configured to:

receive a plurality of wireless communication network policies from an orchestration system;

send a subscription request to a radio access network (RAN) central unit (CU) to receive notifications relating to Protocol Data Unit (PDU) sessions set up by the RAN CU, wherein the RAN CU is located in the RAN;

receive a notification from the RAN CU that a PDU session has been set up in the RAN, wherein the notification includes information associated with the PDU session, based on the sent subscription request;

identify a programmable transport network switch located in the RAN, wherein the programmable transport network switch is associated with the PDU session, wherein the programmable transport network switch is located along an xHaul connection in the RAN;

select a policy, from the plurality of wireless communication network policies, based on the information associated with the PDU session; and configure the programmable transport network switch to apply the selected policy to the PDU session along the xHaul connection in the RAN.

12. The device of claim 11, wherein, when selecting the policy, from the plurality of wireless communication network policies, based on the information associated with the PDU session, the processor is further configured to:

determine a network slice associated with the PDU session; and select a network slice policy associated with the determined network slice for the PDU session.

13. The device of claim 11, wherein the selected policy includes at least one of:

a Class of Service (CoS) policy, a mobility management policy, a security policy, a policy to collect values for a particular key performance indicator (KPI), a Self-Optimizing Network (SON) policy, or or a Multi-Access Edge Computing (MEC) policy.

14. The device of claim 11, wherein the processor is further configured to:

collect at least one metric value associated with the PDU session from the programmable transport network switch; and report the collected at least one metric value to another device.

15. The device of claim 11, wherein the processor is further configured to:

receive an update for the selected policy from the orchestration system; and reconfigure the programmable transport network switch based on the update.

16. The device of claim 11, wherein the processor is further configured to:

receive another notification from the RAN CU indicating that the PDU session has ended; and configure the programmable transport network switch to remove the applied policy, in response to receiving the other notification.

17. The device of claim 11, wherein the programmable transport network switch is at least one of:

located along the xHaul connection from a radio unit (RU) to a distributed unit (DU), located along the xHaul connection from a distributed unit (DU) to the CU, or located along the xHaul connection from the CU to a core network.

18. A system comprising:

a radio access network (RAN) central unit (CU), located in the RAN, configured to:

receive a request to set up a protocol data unit (PDU) session from a core network device; and set up the PDU session in the RAN based on the received request; and a switch controller configured to:

receive a plurality of wireless communication network policies from an orchestration system;

send a subscription request to the RAN CU to receive notifications relating to PDU sessions set up by the RAN CU;

receive a notification from the RAN CU that the PDU session has been set up in the RAN, wherein the notification includes information associated with the PDU session, based on the sent subscription request;

identify a programmable transport network switch located in the RAN, wherein the programmable transport network switch is associated with the PDU session, wherein the programmable transport network switch is located along an xHaul connection in the RAN;

select a policy, from the plurality of wireless communication network policies, based on the information associated with the PDU session; and configure the programmable transport network switch to apply the selected policy to the PDU session along the xHaul connection in the RAN.

19. The system of claim 18, wherein, when selecting the policy, from the plurality of wireless communication network policies, based on the information associated with the PDU session, the switch controller is further configured to:

determine a network slice associated with the PDU session; and select a network slice policy associated with the determined network slice for the PDU session.

20. The system of claim 18, wherein the selected policy includes at least one of:

a Class of Service (CoS) policy, a mobility management policy, a security policy, a policy to collect values for a particular key performance indicator (KPI), a Self-Optimizing Network (SON) policy, or or a Multi-Access Edge Computing (MEC) policy.

* * * * *